(12) United States Patent
Lee et al.

(10) Patent No.: US 9,618,996 B2
(45) Date of Patent: Apr. 11, 2017

(54) POWER CAPPING APPARATUS AND METHOD

(71) Applicant: ELECTRONICS AND TELECOMMUNICATIONS RESEARCH INSTITUTE, Daejeon (KR)

(72) Inventors: Byung-Gyu Lee, Daejeon (KR); Baik-Song An, Seoul (KR); Sung-Ik Jun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 135 days.

(21) Appl. No.: 14/482,576

(22) Filed: Sep. 10, 2014

(65) Prior Publication Data

US 2015/0074434 A1 Mar. 12, 2015

(30) Foreign Application Priority Data

Sep. 11, 2013 (KR) .................. 10-2013-0109402
Aug. 7, 2014 (KR) .................. 10-2014-0101866

(51) Int. Cl.
*G06F 1/32* (2006.01)
(52) U.S. Cl.
CPC .................. *G06F 1/3206* (2013.01)
(58) Field of Classification Search
CPC .................................................... G06F 1/3206
See application file for complete search history.

(56) References Cited

U.S. PATENT DOCUMENTS

| 6,526,516 B1 * | 2/2003 | Ishikawa ................. G06F 1/189 348/207.2 |
| 7,661,003 B2 * | 2/2010 | Naffziger .............. G06F 1/3203 702/117 |
| 8,006,108 B2 | 8/2011 | Brey et al. |
| 8,060,765 B1 * | 11/2011 | Cha ........................... G06F 1/08 713/300 |

(Continued)

FOREIGN PATENT DOCUMENTS

| EP | 2 360 552 A2 | 8/2011 |
| KR | 10-0463842 | 12/2004 |

(Continued)

*Primary Examiner* — Thomas Lee
*Assistant Examiner* — Mohammad A Rahman
(74) *Attorney, Agent, or Firm* — Staas & Halsey LLP

(57) ABSTRACT

A power capping apparatus including a measurement unit to measure a performance counter value and a used amount of power of the computing system before a power limit value is set. A calculation unit to calculate an energy reference value used in an energy conservation mode using the used amount of power and the performance counter value. A management unit to compare a first used amount of power measured before a power limit value is set with the power limit value when the power limit value is set, and limit the used amount of power to a value below the power limit value when the first used amount of power is greater than the power limit value, wherein the management unit outputs an error message so that a user sets the power limit value in which the energy reference value is within an effective range in the energy conservation mode.

8 Claims, 6 Drawing Sheets

(56) References Cited

U.S. PATENT DOCUMENTS

| | | | |
|---|---|---|---|
| 8,255,709 B2* | 8/2012 | McCarthy | G06F 9/5061 700/30 |
| 8,276,012 B2 | 9/2012 | Hanson et al. | |
| 8,443,210 B2 | 5/2013 | Bandholz et al. | |
| 8,473,768 B2 | 6/2013 | Kim et al. | |
| 8,478,451 B2* | 7/2013 | Li | G06F 1/26 700/291 |
| 9,134,783 B2* | 9/2015 | Goodrum | G06F 1/28 |
| 2003/0126434 A1 | 7/2003 | Lim et al. | |
| 2004/0246247 A1* | 12/2004 | Rossi | G06F 1/3203 345/211 |
| 2005/0028017 A1* | 2/2005 | Janakiraman | G06F 1/263 713/340 |
| 2005/0174709 A1* | 8/2005 | Kushnarenko | H02M 3/073 361/78 |
| 2006/0167657 A1* | 7/2006 | Naffziger | G06F 1/3203 702/182 |
| 2007/0186121 A1* | 8/2007 | Yasuo | G06F 1/3203 713/320 |
| 2009/0150693 A1 | 6/2009 | Kashyap et al. | |
| 2009/0265564 A1 | 10/2009 | Clemo et al. | |
| 2011/0016337 A1 | 1/2011 | Cepulis | |
| 2011/0087715 A1 | 4/2011 | Martens et al. | |
| 2011/0314318 A1 | 12/2011 | Sawai et al. | |
| 2012/0198254 A1 | 8/2012 | Allalouf et al. | |
| 2012/0226922 A1 | 9/2012 | Wang et al. | |
| 2012/0331317 A1 | 12/2012 | Rogers et al. | |
| 2013/0107733 A1* | 5/2013 | Yin | H04L 27/01 370/252 |
| 2013/0117592 A1 | 5/2013 | Humphrey et al. | |
| 2013/0124885 A1* | 5/2013 | Davis | G06F 1/3206 713/320 |
| 2014/0063074 A1* | 3/2014 | Drzaic | G09G 3/30 345/690 |
| 2014/0208136 A1* | 7/2014 | Rahardjo | G06F 1/26 713/320 |
| 2015/0026487 A1* | 1/2015 | Choi | G06F 9/4893 713/300 |
| 2015/0338896 A1* | 11/2015 | Khatri | G06F 1/324 713/320 |

FOREIGN PATENT DOCUMENTS

| | | |
|---|---|---|
| KR | 10-2011-0011657 | 2/2011 |
| KR | 10-1282199 | 6/2013 |

* cited by examiner

POWER CAPPING APPARATUS AND METHOD

CROSS-REFERENCE TO RELATED APPLICATIONS

This application claims priority to and the benefit of Korean Patent Application No. 10-2013-0109402, filed on Sep. 11, 2013 and Korean Patent Application No. 10-2014-0101866, filed on Aug. 7, 2014, the disclosures of which are incorporated herein by reference in their entirety.

BACKGROUND

1. Field of the Invention

The present invention relates to a power capping apparatus and method.

2. Discussion of Related Art

Conventional power capping technology is technology of limiting a used amount of power used in a computing system with a capping value set by a system administrator, and is technology used when power supply is insufficient in a server system of a data center or for operating the system within a predetermined amount of power. There are methods of limiting a total used amount of power in a power supply unit installed in the computing system, and of limiting a used amount of power of various devices (a central processing unit (CPU), a memory, an input/output (I/O) device, etc.) included in the computing system, in the power capping technology.

As shown in FIG. 1, a basic conventional power capping method measures a total used amount of power used by the computing system, and limits a used amount of power of components capable of controlling the used amount of power or a total system when the used amount of power is greater than a power limit value (a capping value) set by a user. FIG. 1 is a drawing illustrating a conventional power capping method.

The computing system to which conventional power capping technology is applied has disadvantages in which degradation of performance is accompanied and a processing time of a job is delayed while executing, since the used amount of power is decreased when a power limiting function is driven. That is, in the conventional power capping methods, the delay of the processing time of the job is not considered due to the degradation of performance accompanied due to the power limitation. Energy (E) with respect to power (P) and a time (T) is represented by the following Equation 1, and the energy E may be equal to an amount of the job performed.

$$E = P \times T \qquad \text{[Equation 1]}$$

That is, it may be regarded as the same amount of the job when a decrease of the used amount of power and a time are increased at the same ratio. For example, when using the conventional power capping method, as shown in a left side of FIG. 2, a job of E1 in which a time t1 is taken using the used amount of power P1 not using a power capping function has to be performed as E2 which is the same amount of the job as E1 even when a time t2 is taken when setting as the used amount of power P2 using the power capping function. However, as shown in a right side of FIG. 2, the delay of the processing time is increased more than a ratio in which the used amount of power is decreased and thus a state of E1<E2' occurs. In a standpoint of energy, an energy saving effect is represented as follows according to states of E1 and E2'.

E1<E2': no energy saving effect
E1=E2': the same consumed amount of energy
E1>E2': energy saving effect As such, the conventional power capping method does not consider the degradation of performance of the system, and limits the used amount of power of the system. Accordingly, in the standpoint of energy, the conventional power capping method has a problem in that more energy is consumed, and a processing amount of the job capable of being completed within a predetermined time is decreased according to the limitation of the used amount of power.

SUMMARY OF THE INVENTION

The present invention is directed to a power capping apparatus and method for limiting a used amount of power of a system while not decreasing energy efficiency by considering performance of the system in response to energy consumption.

According to one aspect of the present invention, there is provided a power capping apparatus for controlling a used amount of power of a computing system, including: a measurement unit configured to measure a performance counter value and the used amount of power of the computing system before a power limit value is set and while the used amount of power is limited; a calculation unit configured to calculate an energy reference value used in an energy conservation mode using the used amount of power and the performance counter value; and a management unit configured to compare a first used amount of power measured before a power limit value is set with the power limit value when the power limit value is set, and limit the used amount of power to a value below the power limit value when the first used amount of power is greater than the power limit value, wherein the management unit outputs an error message so that a user sets the power limit value in which the energy reference value is within an effective range in the energy conservation mode.

The management unit may output the error message so that the user changes the energy conservation mode into a power capping mode or sets to increase the power limit value when the energy reference value is not in the effective range.

The management unit may control such that the used amount of power is decreased to a value within the effective range when the energy reference value is in the effective range.

The calculation unit may calculate the energy reference value using the following Equation, $$EF = \frac{C_{now}}{C_{prev}} \bigg/ \frac{P_{now}}{P_{prev}}$$

where EF represents the energy reference value, Cprev is a first performance counter value measured before the power limit value is set, Cnow is a second performance counter value measured while the used amount of power is limited, Pprev is the first used amount of power measured before the power limit value is set, and Pnow is a second used amount of power measured while the used amount of power is limited.

When the energy reference value is equal to or greater than 1, energy efficiency may be equal to or greater than a previous state, when the energy reference value is smaller than 1, the energy efficiency may be lower than the previous state, and the effective range may be a range in which the energy reference value is equal to or greater than 1.

According to another aspect of the present invention, there is provided a power capping method of a power capping apparatus for controlling a used amount of power of a computing system, including: measuring a first performance counter value and a first used amount of power before a power limit value is set; comparing the first performance counter value with the power limit value when the power limit value is set; limiting the used amount of power to a value below the power limit value when the first used amount of power is greater than the power limit value; measuring a second performance counter value and a second used amount of power while the used amount of power is limited, in an energy conservation mode; calculating an energy reference value using the first performance counter value, the first used amount of power, the second performance counter value, and the second used amount of power; and outputting an error message so that a user sets the power limit value in which the energy reference value is within an effective range.

The outputting of the error message may include outputting the error message so that the user changes the energy conservation mode into a power capping mode or sets to increase the power limit value when the energy reference value is not in the effective range.

The power capping method may further include controlling such that the used amount of power is decreased to a value within the effective range when the energy reference value is in the effective range.

The calculating of the energy reference value may calculate the energy reference value using the following Equation, $$EF = \frac{C_{now}}{C_{prev}} \bigg/ \frac{P_{now}}{P_{prev}}$$

where EF represents the energy reference value, Cprev is the first performance counter value measured before the power limit value is set, Cnow is the second performance counter value measured while the used amount of power is limited, Pprev is the first used amount of power measured before the power limit value is set, and Pnow is the second used amount of power measured while the used amount of power is limited.

When the energy reference value is equal to or greater than 1, energy efficiency may be equal to or greater than a previous state, when the energy reference value is smaller than 1, the energy efficiency may be lower than the previous state, and the effective range may be a range in which the energy reference value is equal to or greater than 1.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
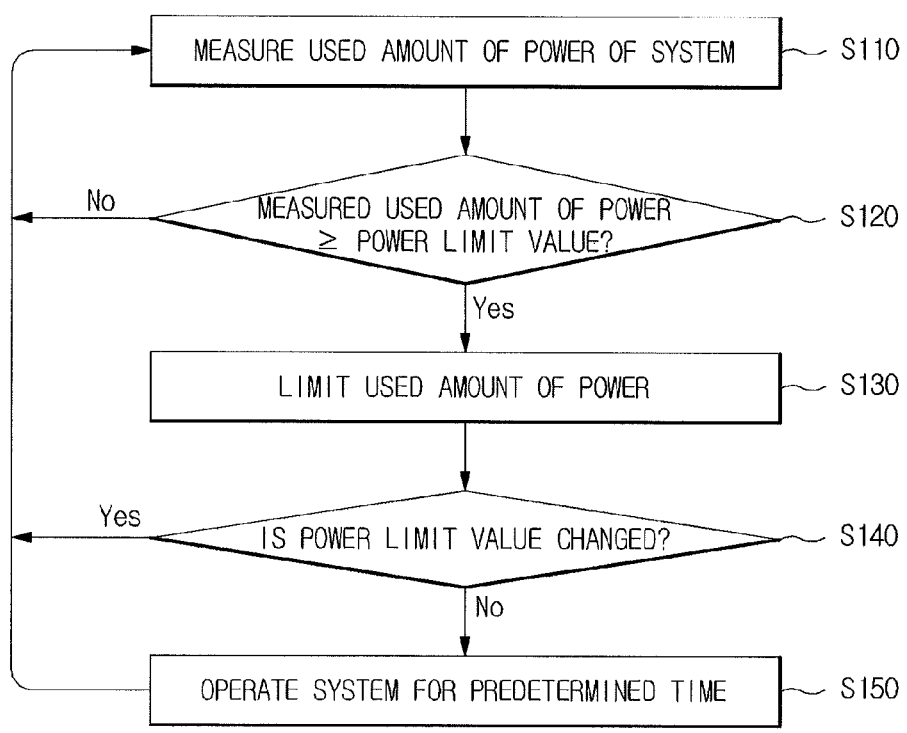
FIG. 1 is a flowchart for describing a conventional power capping method.
Figure 2:
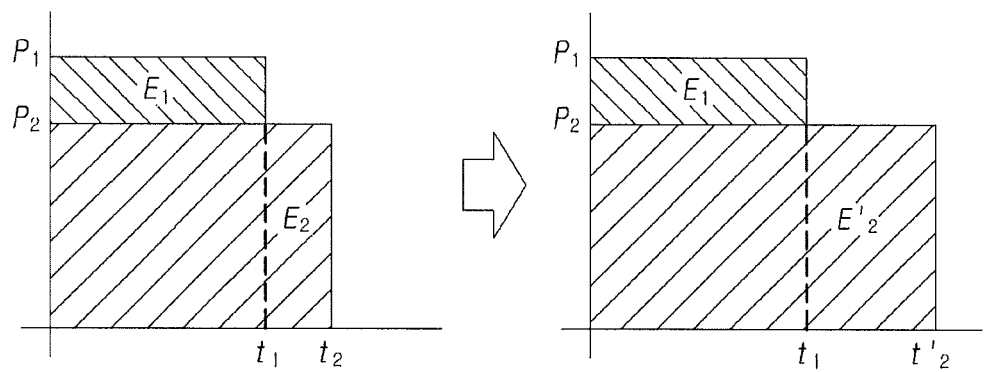
FIG. 2 is a diagram for describing a conventional power capping method.

Exemplary embodiments of the present invention will be described in detail below with reference to the accompanying drawings. While the present invention is shown and described in connection with exemplary embodiments thereof, it will be apparent to those skilled in the art that various modifications, and equivalent and alternative forms can be made without departing from the spirit and scope of the invention.

Hereinafter, in the following description with respect to embodiments of the present invention, when a detailed description of known functions or configurations related to the present invention unnecessarily obscures the gist of the present invention, a detailed description thereof will be omitted. Numerals (for example, a first, a second, etc.) used in the description of the present invention are merely an identifier for identifying one component with another component.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

Hereinafter, embodiments of the present inventive concept will be described below with reference to the accompanying drawings. In the following description of the present invention, the same reference numerals are used in the same means regardless of the reference numerals to help a thorough understanding.

Figure 3:
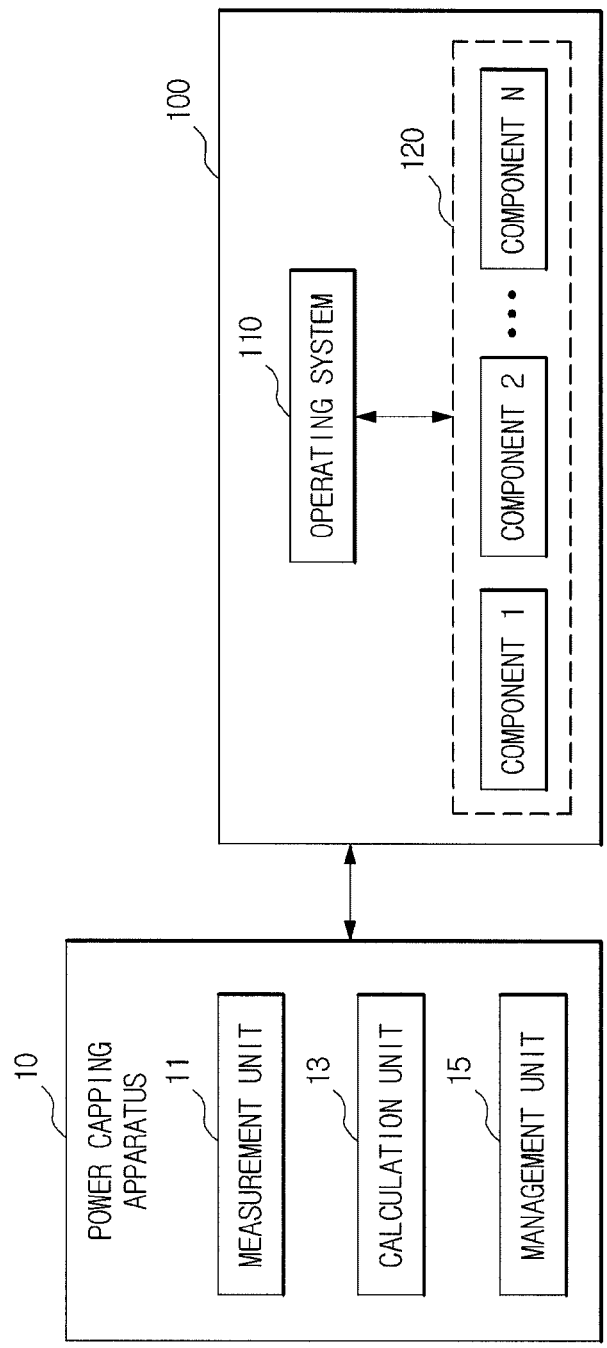
FIG. 3 is a schematic diagram illustrating a construction of a power capping apparatus and a computing system.

FIG. 3 is a schematic diagram illustrating a construction of a power capping apparatus and a computing system.

Referring to FIG. 3, a power capping apparatus 10 may include a measurement unit 11, a calculation unit 13, and a management unit 15, and a computing system 100 may include an operating system 110, and a plurality of components 120. Here, the plurality of components 120 may be a central processing unit (CPU), a memory, an input/output (I/O) device, etc, and each component 120 may have a function controlling a used amount of power.

In the construction diagram of FIG. 3, the reason of indicating the power capping apparatus 10 as a separate block may be merely so that the computing system 100 in which a power capping method is implemented is distinguished from a conventional computing system. That is, the power capping apparatus 10 may be included in the computing system 100. For example, the power capping apparatus 10 may be installed in the computing system 100 as a software module or a hardware module. Further, the power capping apparatus 10 may measure a used amount of power of each component 120, or measure a total used amount of power of the computing system 100. Further, when it is impossible for the power capping apparatus 10 to actually measure the used amount of power, a power use estimation model may be applied to the power capping apparatus 10.

Hereinafter, the power capping apparatus 10 will be described in detail.

The measurement unit 11 may measure a used amount of power and a performance counter value of the computing system 100. For example, the measurement unit 11 may acquire a performance counter value of each component 120 or the computing system 100 provided to each component 120 or the operating system 110. In addition, the measurement unit 11 may measure a total used amount of power of each component 120 or the computing system 100. At this time, the measurement unit 11 may measure the performance counter value or the used amount of power before a power limit value is set and while the used amount of power is limited according to control of the management unit 15.

The calculation unit 13 may calculate an energy reference value used in an energy conservation mode using the used amount of power and performance counter value measured by the measurement unit 11. For example, the calculation unit 13 may calculate the energy reference value using the following Equation 1.

$$EF = \frac{C_{now}}{C_{prev}} \bigg/ \frac{P_{now}}{P_{prev}} \qquad \text{[Equation 1]}$$

Here, EF may represent the energy reference value, Cprev may be the performance counter value measured in a previous state (a state before the power limit value is set), Cnow may be the performance counter value measured in a current state (a state while the used amount of power is limited), Pprev may be the used amount of power measured in the previous state (the state before the power limit value is set), and Pnow may be the used amount of power measured in the current state (the state while the used amount of power is limited).

The management unit 15 may control such that the measurement unit 11 measures a first performance counter value and a first used amount of power in the state before the power limit value is set, compares the measured first used amount of power with the power limit value in the state while the power limit value is set, and limits the used amount of power to a value below the power limit value when the first used amount of power is larger than the power limit value. The management unit 15 may basically operate in a power capping mode of limiting the used amount of power.

After this, the management unit 15 may confirm a mode set by a user, when the mode is an energy conservation mode considering energy efficiency, control such that the measurement unit 11 measures a second performance counter value and a second used amount of power in a current state, that is, in the state while the used amount of power is limited. Next, the management unit 15 may control such that the calculation unit 13 calculates the energy reference value using the first performance counter value and the first used amount of power, and the second performance counter value and the second used amount of power.

Figure 5:
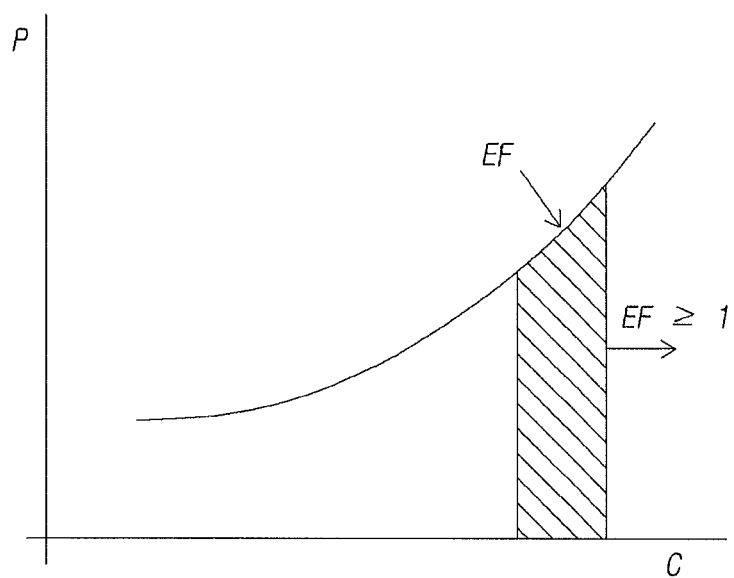
FIG. 5 is a graph illustrating a relationship between a used amount of power and a performance counter value.

Performance of the computing system 100 may not be constantly decreased according to a decrease of the used amount of power. That is, referring to FIG. 5, FIG. 5 is a graph illustrating a relationship between a used amount of power and a performance counter value. As shown in FIG. 5, the energy reference value may be a slope of the graph of the used amount of power and the performance counter value. The energy reference value may have the following meaning according to a range.

EF>1: higher energy efficiency than a previous state
EF=1: the same energy efficiency as a previous state
EF<1: lower energy efficiency than a previous state The management unit 15 may perform a function of guiding a user to set the power limit value such that the energy reference value is equal to or greater than 1 (EF≥1) in the energy conservation mode. For example, when the energy reference value is within an effective range which is equal to or greater than 1, the management unit 15 may control such that the used amount of power of the component 120 which is adjustable or the total used amount of power of the computing system 100 is decreased to a value within the effective range. Further, when the energy reference value is not in the effective range, the management unit 15 may output an error message so that the user changes the mode into the power capping mode or sets to increase the power limit value.

Figure 4:
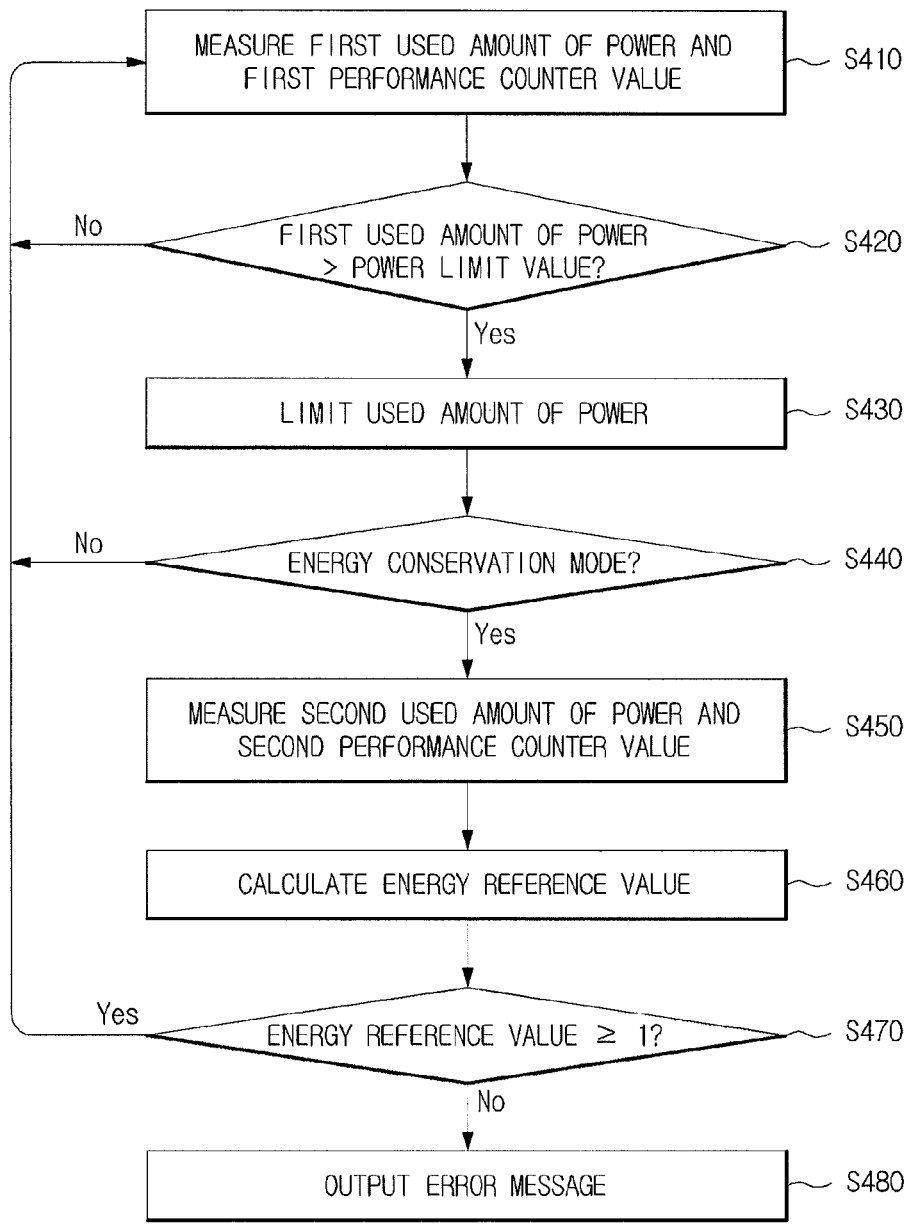
FIG. 4 is a flowchart for describing a power capping method in the power capping apparatus of FIG. 3.

FIG. 4 is a flowchart for describing a power capping method in the power capping apparatus of FIG. 3.

In S410, the power capping apparatus 10 may measure the first performance counter value and the first used amount of power in the state before the power limit value is set.

In S420, when the power limit value is set, the power capping apparatus 10 may compare the measured first used amount of power with the power limit value.

In S430, when the first used amount of power is greater than the power limit value, the power capping apparatus 10 may limit the used amount of power to a value below the power limit value. That is, the power capping apparatus 10 may basically operate in the power capping mode of limiting the used amount of power.

In S440, the power capping apparatus 10 may determine whether the mode set by the user is the energy conservation mode.

In S450, when the power capping apparatus 10 is in the energy conservation mode, the power capping apparatus 10 may measure the second performance counter value and the second used amount of power in a current state, that is, in a state while the used amount of power is limited.

In S460, the power capping apparatus 10 may calculate the energy reference value using the first performance counter value and the first used amount of power, and the second performance counter value and the second used amount of power.

In S470, the power capping apparatus 10 may determine whether the energy reference value is equal to or greater than 1.

In S480, when the energy reference value is smaller than 1, the power capping apparatus 10 may output an error message so that the user changes the energy conservation mode into the power capping mode or sets to increase the power limit value.

When the energy reference value is equal to or greater than 1, the power capping apparatus 10 may control such that the used amount of power of the component 120 which is adjustable or the total used amount of power of the computing system 100 is decreased to a value within the effective range.

Figure 6:
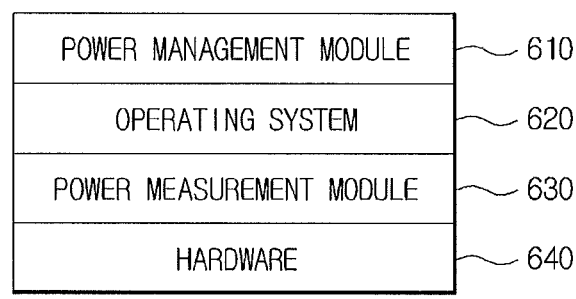
FIG. 6 is a diagram illustrating layers of a computing system to which a power capping apparatus is applied.

FIG. 6 is a diagram illustrating layers of a computing system to which a power capping apparatus is applied.

Referring to FIG. 6, the computing system to which the power capping apparatus is applied may include hardware 640, a power measurement module 630, an operating system 620, and a power management module 610, which are sequentially configured from the lowest layer.

The power measurement module 630 may measure the used amount of power of each component of the hardware 640, or the total used amount of power of the total system in which the components of the hardware 640 are included. The power measurement module 630 may be located inside or outside of the system. The used amount of power measured inside or outside the system may be transferred to the power management module 610 through the operating system 620. The power management module 610 may be software included in the operating system 620, and hardware which is independently configured or application software which is in an upper layer of the operating system 620. The power management module 610 may receive the power limit value or a mode set through an interface with the user using the application software. For example, the interface with the user may be an in-band type in which the user directly inputs, or an out-of-band type such as a web.

Meanwhile, the power capping method according to an embodiment of the present invention may be recorded in a storage medium by being implemented as a program command type which is executable through a means for electronically processing various kinds of information. The storage medium may include a program command, a data file, a data structure, etc. alone or in combination.

The program command recorded in the storage medium may be specially designed and configured for the present invention, or may be a command which is well known and used by those of ordinary skill in the computer software field. Examples of the storage medium may be a hardware device which is specially configured to store and execute the program command including a magnetic medium such as a hard disk, a floppy disk, and a magnetic tape, an optical recording medium such as a compact disc-read only memory (CD-ROM) and a digital video disc (DVD), a magneto-optical medium such as a floptical disk, a read only memory (ROM), a random access memory (RAM), or a flash memory. In addition, the storage medium may be a transmission medium such as optical or metallic lines, waveguides including a carrier waver transmitting signals specifying the program command, a data structure, etc. Examples of the program command may include a device which electronically processes information using an interpreter, etc, for example, high-level language codes which are executable by a computer, as well as machine codes which are made by a compiler.

The hardware device described above may be configured to be operated by one or more software modules in order to perform an operation of the present invention, and vice versa.

The present invention may not decrease energy efficiency by considering the performance of the system in response to the energy consumption, and may limit the used amount of power of the system.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A power capping apparatus for controlling a used amount of power of a computing system, comprising:
computer hardware to implement:
a measurement unit configured to measure:
a first performance counter value and a first used amount of power of the computing system before a power limit value is set, and
a second performance counter value and a second used amount of power of the computing system while the used amount of power is limited by the set power limit value;
a calculation unit configured to calculate an energy reference value used in an energy conservation mode using the first used amount of power and the second used amount of power and the first performance counter value and the second performance counter value; and
a management unit configured to:
compare the first used amount of power with the power limit value while the power limit value is set, and
limit the used amount of power to a value below the power limit value when the first used amount of power is greater than the power limit value,
wherein:
the energy reference value indicates energy efficiency of the energy conservation mode,
when the energy reference value indicates that the second performance counter value per the second used amount of power is lower than the first performance counter value per the first used amount of power, the management unit outputs an error message so that a user sets the power limit value in which the energy reference value is within an effective range in the energy conservation mode, and
the calculation unit calculates the energy reference value using the following Equation, $$EF = \frac{C_{now}}{C_{prev}} \Big/ \frac{P_{now}}{P_{prev}}$$

where EF represents the energy reference value, Cprev is the first performance counter value measured before the power limit value is set, Cnow is the second performance counter value measured while the used amount of power is limited, Pprev is the first used amount of power measured before the power limit value is set, and Pnow is the second used amount of power measured while the used amount of power is limited.

2. The power capping apparatus of claim 1, wherein the management unit outputs the error message so that the user changes the energy conservation mode into a power capping mode or sets to increase the power limit value when the energy reference value is outside the effective range.

3. The power capping apparatus of claim 2, wherein the management unit controls such that the used amount of power of the computing system is decreased to a value within the effective range when the energy reference value is in the effective range.

4. The power capping apparatus of claim 1, wherein, when the energy reference value is equal to or greater than 1, energy efficiency is equal to or greater than a previous state, when the energy reference value is smaller than 1, the energy efficiency is lower than the previous state, and the effective range is a range in which the energy reference value is equal to or greater than 1.

5. A power capping method of a power capping apparatus for controlling a used amount of power of a computing system, comprising:
measuring a first performance counter value and a first used amount of power before a power limit value is set;

comparing the first performance counter value with the power limit value when the power limit value is set;
limiting the used amount of power to a value below the power limit value when the first used amount of power is greater than the power limit value;
measuring a second performance counter value and a second used amount of power while the used amount of power is limited, in an energy conservation mode;
calculating an energy reference value using the first performance counter value, the first used amount of power, the second performance counter value, and the second used amount of power,
wherein:
  the energy reference value indicates energy efficiency when the power limit value is set,
  when the energy reference value indicates that the second performance counter value per the second used amount of power is lower than the first performance counter value per the first used amount of power, outputting an error message so that a user sets the power limit value in which the energy reference value is within an effective range, and
  the calculating of the energy reference value calculates the energy reference value using the following Equation, $$EF = \frac{C_{now}}{C_{prev}} \bigg/ \frac{P_{now}}{P_{prev}}$$

where EF represents the energy reference value, Cprev is the first performance counter value measured before the power limit value is set, Cnow is the second performance counter value measured while the used amount of power is limited, Pprev is the first used amount of power measured before the power limit value is set, and Pnow is the second used amount of power measured while the used amount of power is limited.

6. The power capping method of claim 5, wherein the outputting of the error message comprises outputting the error message so that the user changes the energy conservation mode into a power capping mode or sets to increase the power limit value when the energy reference value is outside the effective range.

7. The power capping method of claim 6, further comprising controlling such that the used amount of power of the computing system is decreased to a value within the effective range when the energy reference value is in the effective range.

8. The power capping method of claim 5, wherein, when the energy reference value is equal to or greater than 1, energy efficiency is equal to or greater than a previous state, when the energy reference value is smaller than 1, the energy efficiency is lower than the previous state, and the effective range is a range in which the energy reference value is equal to or greater than 1.

* * * * *